UNITED STATES PATENT OFFICE.

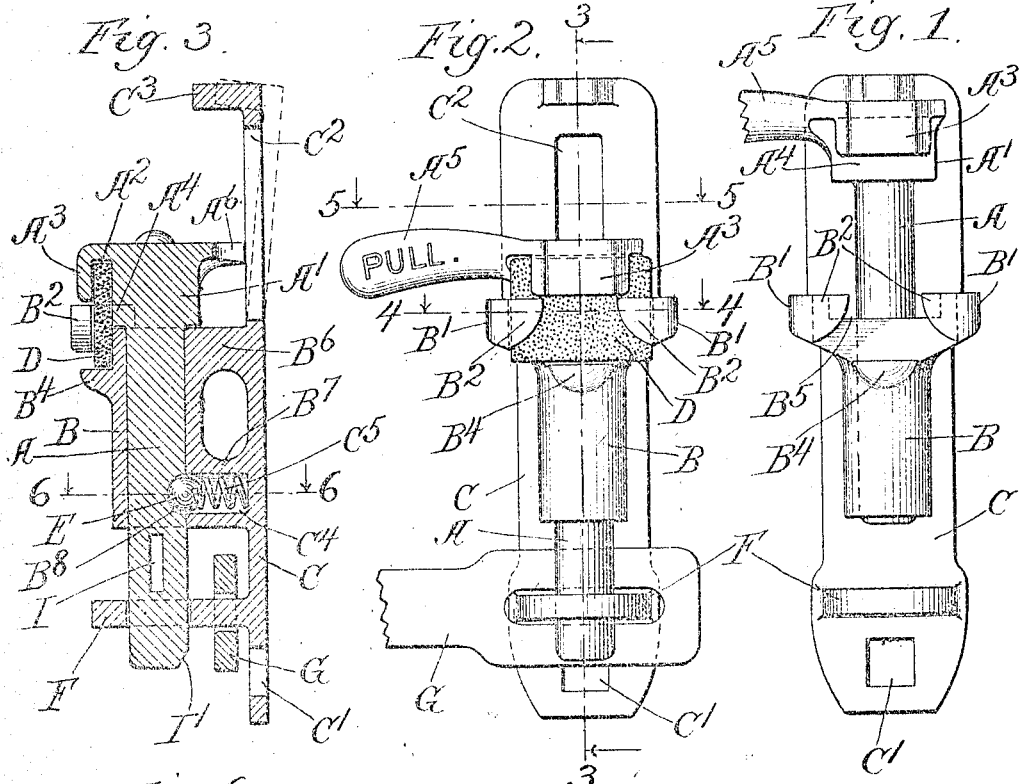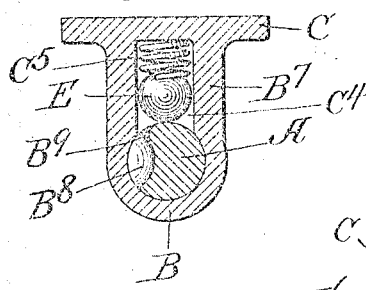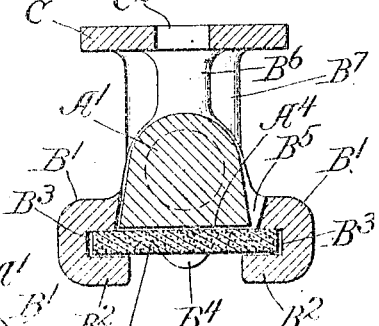

WILLIAM L. SEBRING, OF COLORADO SPRINGS, COLORADO, ASSIGNOR TO NATIONAL CAR PROTECTION COMPANY, OF CHICAGO, ILLINOIS, A CORPORATION OF WEST VIRGINIA.

SEAL-LOCK.

No. 892,625.   Specification of Letters Patent.   Patented July 7, 1908.

Application filed May 6, 1907. Serial No. 372,068.

*To all whom it may concern:*

Be it known that I, WILLIAM L. SEBRING, a citizen of the United States, residing at Colorado Springs, in the county of El Paso and State of Colorado, have invented a certain new and useful Improvement in Seal-Locks, of which the following is a specification.

My invention relates to seal locks, and has for its object to provide a seal lock particularly adapted for use on railway cars and the like.

My invention is illustrated in the accompanying drawings, wherein

Figure 1 is a front view of a lock embodying my invention, with the parts in the unlocked position; Fig. 2 is a front view of the device of Fig. 1 showing the parts in their locking position; Fig. 3 is a sectional view taken on line 3—3 of Fig. 2; Fig. 4 is a sectional view taken on line 4—4 of Fig. 2; Fig. 5 is a sectional view taken on line 5—5 of Fig. 2; Fig. 6 is a sectional view taken on line 6—6 of Fig. 3.

Like letters refer to like parts throughout the several figures.

As illustrated in the drawings, the lock comprises a locking bolt, A, rotatably and slidably mounted in a guide or cylinder B, carried by the frame or supporting piece C, by means of which the lock is fastened to the device in connection with which it is used. This attachment may be made in any desired manner, as, for example, by suitable fastening pieces passing through the holes $C^1$, $C^2$ in the supporting piece C. The locking bolt A is provided with an enlarged head $A^1$, provided with a recess $A^2$ into which a portion of the frangible locking seal D is received. This recess is formed between the projection $A^3$ and the engaging face $A^4$ of the head $A^1$. The locking pin is provided with a handle $A^5$ by means of which its position may be varied.

Associated with the locking bolt A is a projection $A^6$ (see Figs. 3 and 5) which limits the rotary movement of the bolt in one direction, and is arranged so that when it engages the support C the bolt is in such position that the seal will be received in the recess $A^2$ when the bolt is lowered. The support C is provided with a projecting stop $C^3$ which is engaged by the enlarged head $A^1$ so as to limit the longitudinal movement of the bolt A, and prevents its withdrawal from the guide or cylinder B. The head $A^1$ is so shaped that it will engage this projection in all the various positions of the bolt.

When the parts are being assembled the upper part of the support C is bent backwardly, as shown in dotted lines in Fig. 3, a sufficient distance to permit the enlarged head to pass by the stop $C^3$ as the bolt is inserted in the guide B. The upper part of the support C may be cast in this bent position if desired. The upper part of the support is then bent to the position shown in full lines, thus preventing the removal of the bolt. When the device is fastened in position it will be seen that the support C cannot then be bent, and it is impossible to remove the bolt from the guide. The device is arranged so that the seal receiving chamber is divided into two parts, one of which is associated with the bolt, and the other with the stationary part of the lock.

As illustrated in the drawing, the guide or cylinder B is provided with laterally projecting lugs or parts $B^1$ which project beyond the guide B. These lugs are connected at the back to the guide B, and the front parts $B^2$ thereof are separated by a space so as to leave the seal D exposed in order that the characters thereon may be easily seen. These lugs are each provided with a seal receiving recess, $B^3$. A projecting lug $B^4$ engages the seal at the bottom and prevents its removal. The material between the lugs $B^1$ is cut away so as to form the space $B^5$ and the lower part of the enlarged head $A^1$ fits in this space between the lugs when the parts are in their locking position. The guide or cylinder B may be connected to the support C in any desired manner, and is preferably connected thereto by the connecting parts $B^6$ and $B^7$ integral therewith. Some suitable device is provided for locking the bolt against longitudinal movement when the parts are in their locking position. As herein shown, the bolt B is provided with a recess $B^8$ which is opposite the chamber $C^4$ when the parts are in their locking position. The ball E is received in the recess $B^8$ and is normally pressed therein by a spring $C^5$ in the chamber $C^4$ (see Fig. 3). The recess $B^8$ is so shaped that when the ball is projecting therein the bolt cannot be moved longitudinally, but can be rotated and when so rotated the inclined face of the recess $B^8$ will press the ball back into the chamber $C^4$, as shown in Fig. 6. When this is done, the bolt can be reciprocated. The recess B⁸ may be cut away at one side so as to form the inclined face B⁹ to facilitate the rotation thereof, the ball E being forced inwardly by the inclined face when the bolt is rotated. When the bolt is circular in cross section this inclined face B⁹ is not essential because of the fact that the edges of the recess at the sides do not project so far outwardly as the edges at the top and bottom. The projecting edges at the top and bottom will prevent the longitudinal movement of the bolt, but those at the sides being so much shorter permit the incline of the bottom of the recess to act to force the ball inwardly. The support C is provided with a keeper, F, for the hasp G on the car, or other door in connection with which the device is used. The locking bolt A passes through a hole in said keeper, as shown in Fig. 2, when the parts are in their locking position so as to prevent the removal of the hasp.

The bolt is provided with a slot I extending therethrough for the purpose of receiving the ordinary seal, or any other suitable locking part which when in position prevents the longitudinal movement of the bolt. The end of the bolt is preferably provided with the inclined face I¹ (see Fig. 3) adapted to engage the ball E when the bolt is being slipped into position so as to force the ball into the chamber C⁴, thus facilitating the assembling of the parts.

I have described in detail a particular construction embodying my invention, but it is of course evident that the parts may be varied, and that some of the parts may be omitted and others used with parts not herein shown without departing from the spirit of my invention. I, therefore, do not limit myself to the particular construction shown.

The use and operation of my invention are as follows: When the device is ready to be assembled, the upper part of the support is in the position shown in dotted lines in Fig. 3. The end of the bolt is then placed in the guide and the bolt pushed therethrough. The thumb or finger or some other obstruction is placed at the lower end of the cylinder or guide B so as to close the end thereof and prevent the ball E from falling out. When the inclined face I¹ of the bolt strikes the ball said ball is forced into the chamber C⁴ and the bolt then slides past it until the recess B⁸ comes opposite the bolt whereupon the spring forces the ball into said recess. The assembling of the parts may be facilitated by inserting the thumb or some other actuating part in the end of the guideway and pressing the ball into the recess C⁴. The bolt cannot now be moved longitudinally but can be rotated. The upper end of the support is then bent to the position shown in full lines, and the device is ready to be attached in position. In the use of the device when it is desired to insert the frangible seal D the handle A⁵ is grasped and pulled toward the operator so as to rotate the bolt A until the ball E is forced into the receptacle C⁴, thus freeing the bolt. The bolt is then moved longitudinally a sufficient distance to permit the frangible seal D to be inserted in the seal receiving recess in the stationary part; that is the recess B³. These frangible seals may be made of baked clay, porcelain, glass or any resisting frangible material. The bolt which is turned back to its original position, that is the position it occupies in Fig. 1, is then moved toward the seal until the seal enters the seal receiving recess A². The ball E then enters the recess B⁸ and prevents further longitudinal movement of the bolt. The parts are then in the position shown in Fig. 2. Before the bolt is lowered the hasp G is placed over the keeper F so that when the bolt is lowered it will be held in place, the bolt passing through the keeper F as shown in Fig. 2. When the parts are in this position the lock is operative because the ball E prevents the bolt from being moved longitudinally and the frangible seal prevents the bolt from being rotated. The only way that the parts can be unlocked is by grasping the handle A⁵ and pulling it outwardly so that the engaging face A⁴ engages the frangible seal and breaks it. The bolt can then be rotated sufficiently to force the ball into the receptacle C⁴ thus permitting the bolt to be lifted and the hasp released. The parts are so arranged that whenever the bolt is rotated to a position where it can be moved longitudinally the frangible seal is destroyed and removed from its seat, and consequently the fact that the device has been tampered with can be readily ascertained. By having the seal recess or seat arranged as herein shown the seal is open to inspection, and in practice the seals will be provided with different characteristics, such as different numbers which will be exposed to view. When these devices are used on cars each door will have a seal of a different number, and the conductor, or other person whose duty it is to keep watch of the matter, will have a record of these different seal numbers, and consequently can ascertain when and where any car has been tampered with because the destruction of the seal can readily be ascertained by the most casual inspection. When it is desired to unlock the car the seal is broken, and the bolt rotated a complete half turn so that the handle will be out of the way, the parts being arranged to permit this. In such event the handle A⁵ will project on the side of the device opposite to that in which it projects in Fig. 2.

It will be seen that by this construction the back of the support C is completely closed, and may thus be left integral, and the only access to the chamber C⁴ and the locking ball E is from the inside or bore of the guide, and that when the pin is in position it completely fills this bore and there is no access to this ball and consequently the device cannot be tampered with, and the only way the car can be unlocked is by breaking the seal. I prefer to cast the parts and this can be done without opening up the back of the support C. so that said back will remain continuous and there is no opening upon it which must be closed, and there is no indication of the position of the chamber C⁴ and no means by which access to said chamber can be secured from the back thereof. The use of the ball permits such a construction, for the ball can be inserted from the bore of the guide, while if the locking device was of some other construction it would necessarily have to be inserted through the support C, thus requiring access to the chamber through said support. It will further be seen that this device is simple in construction, and is so arranged that it can be easily and quickly fastened to any car or any other device, and fulfils all the conditions necessary to practical and commercial use.

I claim:

1. A seal lock comprising a locking bolt, a guide therefor, said bolt being longitudinally and rotatably movable in said guide, a seal seat having a part associated with the bolt and a part associated with the guide, a chamber opening into the bore of the guide, an elastic device in said chamber, a recess in the bolt, and a locking ball adapted to fit into said recess so as to prevent longitudinal movement of the bolt, said ball adapted to be forced into the chamber when the bolt is rotated so as to free the bolt.

2. A seal lock comprising a locking bolt, a guide therefor, said bolt being longitudinally and rotatably movable in said guide, a seal seat having a part associated with the bolt, and a part associated with the guide, a chamber opening into the bore of the guide, an elastic device in said chamber, a recess in the bolt, and a locking ball, said ball projecting into said recess, the ball adapted to be forced into the chamber when the bolt is rotated so as to free the bolt.

3. A seal lock comprising a locking bolt, a guide therefor, said bolt being rotatably and longitudinally movable in said guide, a seal seat having a part associated with the bolt, and a part associated with the guide, a chamber opening into the bore of said guide and closed at the other end, a coil spring in said chamber, a ball adapted to be inserted in said chamber so as to be engaged by said spring, the ball and spring adapted to be inserted into the chamber through the bore of the guide, a recess in said bolt into which said ball is forced by said spring so as to lock the bolt against longitudinal movement, said recess having an inclined face at the side so that when rotated the ball will be forced into the chamber and the bolt released.

4. A seal lock comprising a locking bolt, a guide therefor, said bolt being rotatably and longitudinally movable in said guide, an enlarged head on said bolt, two lugs attached to said guide and provided with seal receiving recesses adapted to receive a portion of a frangible seal, the material between the lugs cut away so as to form a space into which the lower part of the enlarged head of the bolt is received, a seal receiving recess in said enlarged head adapted to receive a portion of a frangible seal, a locking device for locking the bolt against longitudinal movement but adapted to permit rotary movement thereof, the part of the enlarged head between said lugs adapted to engage said seal so as to break it when the bolt is rotated.

5. A seal lock comprising a locking bolt, a guide therefor in which said bolt is free to rotate and to move longitudinally, a ball for locking said bolt against longitudinal movement, said ball intermediate the ends of the bolt when in its locking position and means for removing said bolt from its locking position.

WILLIAM L. SEBRING.

Witnesses:
ABBOTT S. POPE,
J. F. THOMAS.